(12) United States Patent
Wolanin

(10) Patent No.: US 9,661,512 B2
(45) Date of Patent: May 23, 2017

(54) DEVICE AND A METHOD FOR THE TESTING OF ELECTRONIC EQUIPMENT WITH A SPATIALLY SEPARATE CONTROL UNIT

(71) Applicant: Rohde & Schwarz GmbH & Co. KG, Munich (DE)

(72) Inventor: Peter Wolanin, Kranzberg (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 14/382,265

(22) PCT Filed: Feb. 15, 2013

(86) PCT No.: PCT/EP2013/053102
§ 371 (c)(1),
(2) Date: Aug. 29, 2014

(87) PCT Pub. No.: WO2013/127646
PCT Pub. Date: Sep. 6, 2013

(65) Prior Publication Data
US 2015/0024694 A1    Jan. 22, 2015

(30) Foreign Application Priority Data
Mar. 1, 2012 (DE) .................. 10 2012 203 252

(51) Int. Cl.
*H04B 17/00* (2015.01)
*H04W 24/06* (2009.01)

(52) U.S. Cl.
CPC .................. *H04W 24/06* (2013.01)

(58) Field of Classification Search
CPC  H04W 24/06; G06F 11/3672; H04L 12/2697; H04L 43/50
USPC ....................................... 455/67.14
See application file for complete search history.

(56) References Cited

U.S. PATENT DOCUMENTS

| | | | |
|---|---|---|---|
| 5,193,172 A * | 3/1993 | Arai et al. ............ | 718/104 |
| 7,809,988 B1 | 10/2010 | Portal et al. | |
| 8,660,812 B2 * | 2/2014 | Gregg .................. | H04B 17/11 340/7.41 |
| 2003/0005380 A1 * | 1/2003 | Nguyen ............... | G06F 11/273 714/736 |
| 2004/0203726 A1 | 10/2004 | Wei | |
| 2008/0033681 A1 | 2/2008 | Ziomek et al. | |
| 2008/0320345 A1 | 12/2008 | Olgaard | |
| 2011/0053518 A1 | 3/2011 | Shindo et al. | |

FOREIGN PATENT DOCUMENTS

| | | |
|---|---|---|
| EP | 1937010 | 6/2008 |
| WO | WO2007/070491 | 6/2007 |
| WO | WO2009023516 | 2/2009 |

* cited by examiner

*Primary Examiner* — Eugene Yun
(74) *Attorney, Agent, or Firm* — Lee & Hayes, PLLC

(57) ABSTRACT

A device for testing electronic equipment comprising a measuring unit with a connection unit for the input and output of signals to a device under test, and a first processor, and a control unit, spatially separate from the measuring unit, that includes a second processor. The first processor and/or the second processor implement the control of the measurement procedure and the evaluation of the measured signals. The device control unit includes a remote-control unit for the remote control of the measuring unit.

17 Claims, 2 Drawing Sheets

Figure 1:
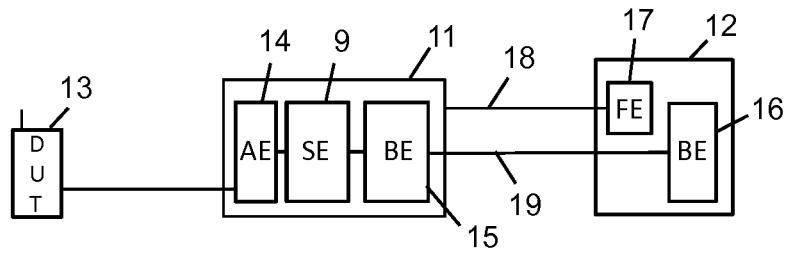

DEVICE AND A METHOD FOR THE TESTING OF ELECTRONIC EQUIPMENT WITH A SPATIALLY SEPARATE CONTROL UNIT

This Application is a National Stage of International Application No. PCT/EP2013/053102, filed Feb. 15, 2013, which claims foreign priority to German Patent Application No. DE 10 2012 203 252.5, filed Mar. 1, 2012, all of which are incorporated herein by reference.

The present invention relates to a device and a method for testing electronic equipment with a measuring unit, which comprises a connection unit and a processor, and a spatially separate control unit with a second processor.

In addition to elaborate measurement circuits, contemporary measurement and evaluation arrangements also comprise elaborate evaluation procedures. For example, WO 2007/070491 A2 describes a measuring-device-based, distributed evaluation system in which the evaluation of the measurement results is implemented in a distributed architecture. Such a measurement and evaluation arrangement comprises a measuring device, for example, an oscilloscope or spectrum analyser, a processing client and at least one subordinate processing element which are connected to one another through a network. In this context, the processing client generates a processing order, which comprises one or more work packets, and distributes these work packets to one or more processing elements, which work through the work packets and report the results back to the processing client. Either the processing client or a subordinate processing element can be arranged in the measuring device itself. The distributed architecture described is used for simulation calculations on the basis of measured received signals.

During development and especially for acceptance testing, each individual mobile-radio device is tested, conventionally with a tester, with regard to its functional efficiency. In this context, the tester comprises a plurality of test programs in order to test the diverse functions of the mobile-radio device. Through an outsourcing of individual test programs to spatially separate processors, the duration of a measurement or respectively of a test can in fact be shortened. However, different measurements must often be implemented one after the other, so that a manual selection and a manual starting of the test procedure is very time consuming. Conversely, with contemporary test equipment, an expansion of the test programs must be implemented by merging new software into the measuring device itself or through an elaborate expansion of the measuring-device hardware.

Accordingly, the object of the present invention is to provide a device and a method for testing electronic equipment, which allows or respectively allow a high-performance and time-efficient implementation of measurements and a simple expansion of the test programs also with regard to additional computational performance.

The object is achieved by the device according to the invention with the features according to claim 1 and by the method according to the invention with the features according to claim 8. Advantageous further developments of the device and respectively of the method according to the invention are presented in the dependent claims.

The device according to the invention for testing electronic equipment comprises a measuring unit with a connection unit for the input and output of signals to a device under test and a first processor and a spatially separate control unit with a second processor, wherein the control unit additionally comprises a remote-control unit for the remote-control of the measuring unit. The remote-control unit in a spatially separate control unit allows the measuring unit to be controlled remotely, that is, for example, to select a desired test procedure from a plurality of different test procedures, to start a test procedure or to append several test procedures to one another. Furthermore, signal parameters and/or test parameters can be adjusted from a workstation which is spatially separate from the test-bed, which is disposed, for example, in an electromagnetically shielded room. Similarly, via the remote-control unit, updates can be fed into the measuring unit and/or additional processing capacity can be simultaneously connected via the second processor.

It is particularly advantageous if at least one spatially separate auxiliary processor is connected to the measuring unit, and, as master processor, the first processor, which is disposed in the measuring unit, controls the at least one auxiliary processor and the second processor in the control unit. Through this separate auxiliary processor, additional computational capacity can be provided in a simple manner for the control of the measurement procedure and/or for the evaluation. In this context, the first and/or second processor can implement the control of the measurement procedure and the evaluation of the measurement signals. Accordingly, the first processor in the measuring device itself implements the control and distribution of individual processing tasks. For example, processing tasks closely associated with the input and/or output signal, such as initial evaluation steps, can remain within the measuring unit, so that the duration of the evaluation is not prolonged through long transmission times of large data volumes to an auxiliary processor. The first processor can determine the load situation quickly and promptly through short, internal connections and can outsource processing tasks in a load-dependent manner to the second processor or the at least one auxiliary processor.

Alternatively, it is also advantageous if at least one spatially separate auxiliary processor is connected to the control unit, and, as master processor, the second processor, which is arranged in the control unit, controls at least one auxiliary processor and the first processor.

In this case, the control unit becomes the "master", and the first processor and the at least one auxiliary processor become a so-called "slave". This allows the first processor in the measuring unit to be equipped with a small processing capacity or also to be completely removed, in order to create space, for example, plug-in positions, for other components of the measuring unit, such as measurement-technology or signal-processing components. The control unit can be embodied in the form of a conventional personal computer (PC) and is therefore cost favourable and can be simply replaced with a higher performance model in the event of increasing demands on computational performance. The number and type of data interfaces in the remote-control unit as the master processor can be simply expanded, and accordingly, additional auxiliary processors can be connected, for example, via higher performance data interfaces.

It is advantageous if the measuring unit comprises a signal unit which receives the modulated high-frequency signals from the device under test, determines modulation parameters from them and routes the latter to the master processor. Especially in the case of the testing of mobile-radio devices, the modulation parameters form the basic data which are modified in the evaluation and analysed. If the signal unit routes these parameters directly to the master processor, processing tasks which relate directly to the modulation parameters can be distributed by the master processor. Accordingly, it is also possible to have evaluations which are based on the same modulation parameters but which test different functions implemented in parallel in that the master processor duplicates these modulation parameters and routes them to several auxiliary processors.

It is advantageous if the master processor outsources identical or different parts of an evaluation program to the further processors. If the master processor outsources identical parts of the control program and/or evaluation program to one or more auxiliary processors, for example, several electronic devices can be tested at the same time. By contrast, if the master processor outsources different parts of the control and/or evaluation program to further auxiliary processors, the test duration is accelerated through parallel processing of different program components.

The method according to the invention for testing electronic equipment thus solves the above named object by transmitting signals to a device under test and receiving signals through a connection unit of a measuring unit, wherein the measuring unit is controlled by a remote-control unit which is arranged in the spatially separate control unit. Accordingly, a convenient and time-optimised testing operation is possible in order to work through complex and in some cases multi-stage test procedures rapidly and conveniently.

The control of the measurement process and evaluation of the measured signals can advantageously be implemented by a first processor which is arranged in a measuring unit, and/or by a second processor which is arranged in a control unit spatially separate from the measuring unit.

Figure 2:
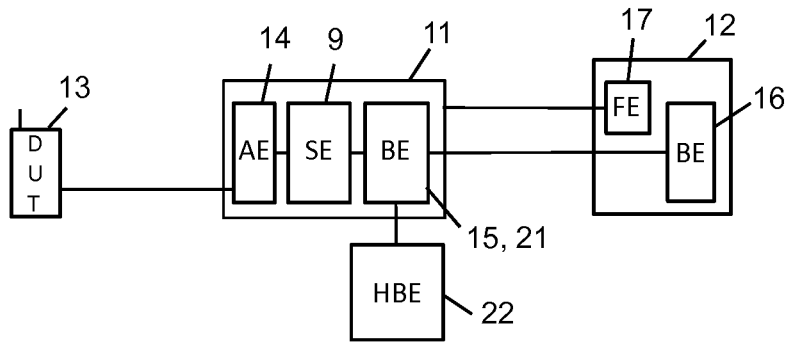
Figure 3:
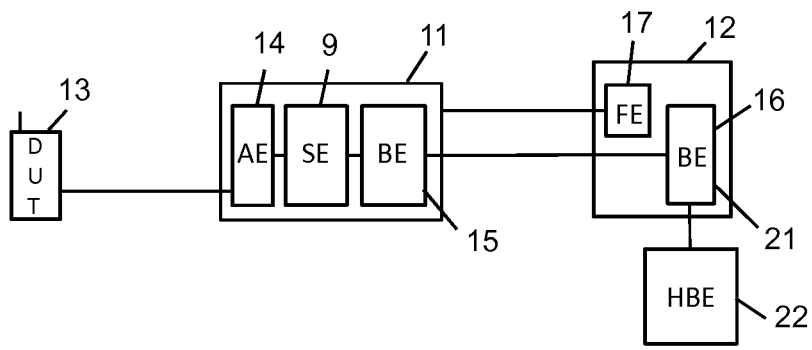
Figure 4:
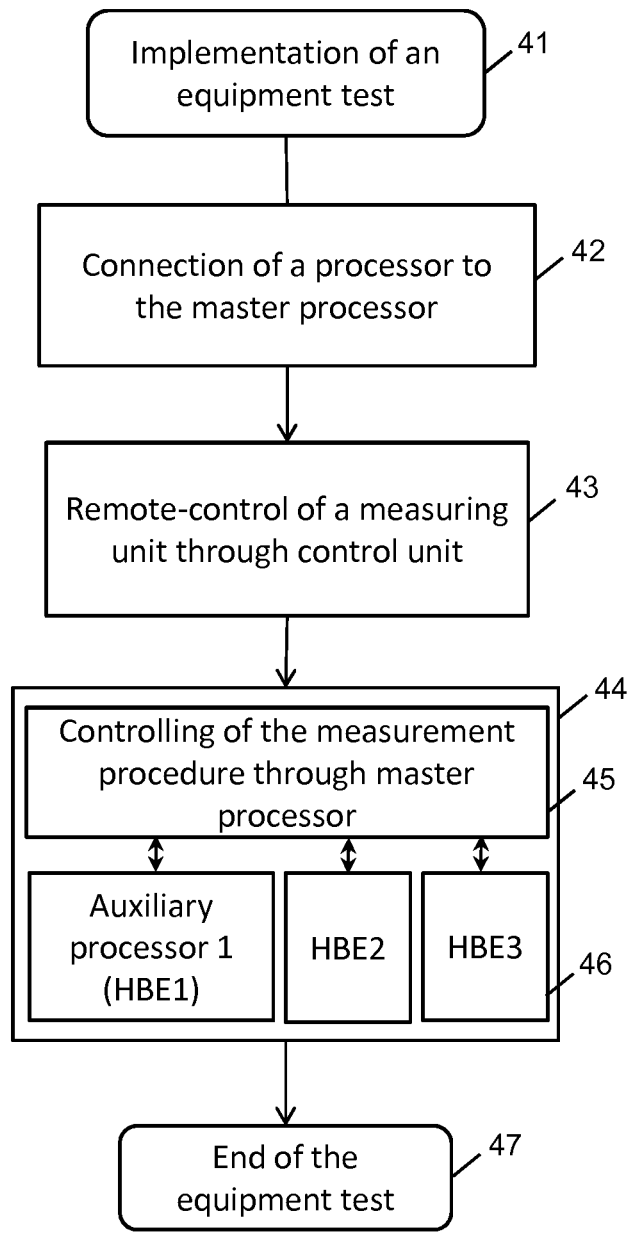

Exemplary embodiments of the device according to the invention and the method according to the invention are presented by way of example in the drawings and will be explained in greater detail with reference to the following description. The drawings show:

FIG. 1 a first exemplary embodiment of the device according to the invention in a schematic view;

FIG. 2 a second exemplary embodiment of the device according to the invention in a schematic view;

FIG. 3 a third exemplary embodiment of the device according to the invention in a schematic view; and FIG. 4 an exemplary embodiment of a method according to the invention as a flow chart.

Mutually corresponding parts are shown with identical reference numbers in all of the drawings.

FIG. 1 shows a first testing-device arrangement 10 with an electronic device under test 13 (English: "device under test", DUT), a measuring unit 11 and a control unit 12. The measuring unit 11 comprises a connection unit 14 to which one or also several electronic devices are connected. The testing-device arrangement 10 shows, by way of example, a mobile-radio user device, of which the various functionalities are tested, for example, in the development process, and following this, for acceptance testing. The measuring unit 11 comprises a signal unit 9, in which, for example, high-frequency signals are generated and modulated corresponding to a specified test procedure. In the case of the frequently used quadrature-amplitude modulation method (QAM), orthogonal I-/Q-components are combined to form a complex signal. In turn, the I-/Q components are determined from received signals and further processed. Such high-frequency components comprise complex circuits, which are electromagnetically shielded in order to protect the other components.

The measuring unit 11 further comprises a first processor 15, which controls the procedure of the measurements and is responsible for the evaluation of the measured signals. As a result of the diverse functionalities, especially of the multifunctional mobile-radio equipment and sophisticated transmission functionalities, such as regulation of the transmission power, error-correction methods and elaborate modulation methods, a plurality of different testing programs an evaluation programs are necessary, and these require a large memory capacity and a high computational performance, especially in order to minimise the duration of the test.

The control unit 12 spatially separated from the measuring unit 11 comprises a second processor 16 and a remote-control unit 17. The second processor 16 provides additional computational performance and memory capacity.

The two processors 15, 16 form a hierarchical control architecture, wherein one processor, here, for example, the first processor 15, assumes the master role as the master processor, the second processor 16 assumes the slave role. A reverse role distribution is also possible. In the slave role, the processor 16 receives processing orders and data from the master processor 15 and transmits the results back again to the master processor 15.

The remote-control unit 17 is also arranged in the separate control unit 12 and regulates and controls the measuring unit. For example, via the remote-control unit 17, a test procedure can be selected, parameters can be set for it, and the measurement can be started. Furthermore, several test procedures can be controlled in parallel if this is supported by the measuring unit 11. Additional program components can also be installed on the first processor via the remote-control unit 17. Accordingly, a simple operation of the measuring unit 11 is provided, which allows a convenient, simple and rapid measurement procedure and also performs servicing tasks. The control unit can, for example, be a standard, commercially available personal computer which obtains the remote-control unit 17 and second processor 16 through installation of the corresponding program components, for example, from the measuring unit 11 itself. Accordingly, the test device 10 can be readily expanded with regard to its computational performance.

The remote-control unit 17 is connected to the measuring unit 11 via a remote-control interface 18. In particular, an Ethernet and/or USB and/or Firewire and/or GBIP connection is present as a remote-control interface 18. For the connection of the first processor 15 to the second processor 16, an Ethernet and/or USB and/or Firewire connection is used as the processing interface 19 for serial data transmission, or a data bus as specified in the PCI or PCI-X or PCI-Express or PXI-Standard. The last named parallel data bus is also used, for example, for connecting the different units 9, 14, 15 in the measuring unit 11. The remote-control interface 18 and the processing interface 19 can be guided in separate cables or together within one physical cable.

FIG. 2 shows a testing-device arrangement 20 which is built up from a measuring unit 11 and the remote-control unit 12. The measuring unit 11 again comprises a connection unit 14, a signal unit 9 and a first processor 15. An additional, auxiliary processor 22 is connected to this first processor 15. In this context, the first processor 15 now controls the second processor 16 and additionally the auxiliary processor 22. As master processor 21, the first processor 15 accordingly embodies the master; the second processor 16 and the auxiliary processor 22 operate as slave. The first processor 15 controls the selected test procedure or test-procedure sequences, which are adjusted and started by the remote-control unit 17, and distributes processing tasks to the processors 16, 22. These implement the processing and supply the results back to the first processor 15.

FIG. 3 illustrates a testing-device arrangement 30, in which the auxiliary processor 22 is now connected to the second processor 16. Here, the second processor 16 assumes the role of the master and is accordingly the master processor 21. The first processor 15 now operates in exactly the same manner as the auxiliary processor 22 as a slave and receives from the second processor 16 processing tasks, which it works through and transmits back the result to the second processor 16.

Here, the control unit 12 now assumes the entire control of the testing-device 30. The first processor 15 can be reduced to a minimum or can also completely disappear. In this context, it must only be ensured that the measuring unit 11 can install control programs/evaluation programs at least once on processors 16, 22. The space gained can be used for the expansion of the measuring unit 11 and especially of the signal unit 9.

The processors operating as slave, 15 or 16 in FIG. 1, or respectively 16, 22 in FIG. 2, or 15, 22 in FIG. 3, are configured, for example, by the respective master processor 16 or 15 or respectively 15 or 16 and at least parts of the evaluation programs are preferably installed by them.

Accordingly, the computational performance of such a testing-device 10, 20, 30 can be readily expanded and distributed between several physically separate components, see the processors 15, 16, 22. In this context, especially the control unit 12 and the auxiliary processor 22 can be implemented on conventional computers. By contrast with a highly specialised measuring unit 11, these are available at favourable cost and can be replaced by higher performance computers. The remote-control unit 17 guarantees a control of the measuring unit favourable to the conditions.

FIG. 4 shows an exemplary method procedure 40 for the implementation of an equipment test. For this purpose, in a first method step 42, the processor is connected to a master processor. Accordingly, in the case of a first use of the master processor, at least parts of the processing software, that is, control programs and evaluation programs, are installed on the processor. In the next method step 43, the measuring unit is remotely controlled by the control unit and the remote-control unit arranged in it. Through the remote-control, for example, parameter settings of the test signal can be set up or a test procedure can be selected or several test procedures can be linked to form a test sequence.

Similarly, the test procedure can be started or respectively stopped by remote-control. The control of the test procedure and the evaluation of the signals received are implemented in method step 44. For this purpose, the master processor forms processing tasks which it distributes to one or more auxiliary processors 46 or respectively the first or second processor, which operates as a slave. The auxiliary processors 46 report back their results to the master processor, which forms the final result of the test procedure from these. This can be displayed on a display unit of the measuring unit 11 and/or on the control unit 12. The end of the equipment test 47 is accordingly reached.

All of the features described and/or illustrated can be advantageously combined with one another within the scope of the invention. The invention is not restricted to the exemplary embodiments described. For example, several auxiliary processors can be used in order to expand the computational capacity of the device.

The invention claimed is:

1. A device for testing electronic equipment comprising:
    a measuring unit with a connection for the input and output of signals to a device under test, and a master processor,
    at least one auxiliary processor spatially separate from the measuring unit, the at least one auxiliary processor connected to the measuring unit; and
    a control unit spatially separate from the measuring unit, the control unit includes a slave processor, and a remote control unit for the remote control of the measuring unit;
    wherein the master processor implements control and distribution of individual measuring tasks between the master processor and the slave processor;
    wherein a plurality of test procedures are controlled in parallel;
    wherein the master and/or slave processors implement control of a measurement procedure and evaluation of measured signals, and the master processor controls the at least one auxiliary processor and the slave processor; and
    wherein the at least one auxiliary processor provides additional computing capacity for the control of the measurement procedure and evaluation of measured signals.

2. The device according to claim 1, wherein the measuring unit includes a signal unit that receives modulated high-frequency signals from the device under test, and determines from the high-frequency signals modulation parameters and routes the modulation parameters to the master processor.

3. The device according to claim 1, wherein the measuring unit includes a signal unit that receives modulated high-frequency signals from the device under test, and determines from the high-frequency signals modulation parameters and routes the modulation parameters to the master processor.

4. The device according to claim 1, wherein the master processor outsources identical or different parts of an evaluation program to the slave processor or the auxiliary processor.

5. The device according to claim 1, wherein the master processor always implements control of the measuring procedure.

6. The device according to claim 1, wherein the master processor outsources identical or different parts of an evaluation program to the slave processor or the auxiliary processor.

7. The device according to claim 1, wherein the master processor implements control of the measuring procedure.

8. The device according to claim 1, further comprising a remote control interface positioned between the measuring unit and the control unit, wherein the remote control interface comprises Ethernet, universal serial bus (USB), Firewire, general purpose interface bus (GBIP) specification, or any combination thereof.

9. A method for testing electronic equipment comprising:
    transmitting signals to a device under test,
    receiving signals through a connection unit of a measuring unit, the measuring unit comprising a master processor, and
    controlling measurement and evaluation of measured signals with a master processor positioned in the measuring unit, or with a slave processor positioned in a remote control unit that is spatially separate from the measuring unit,
    wherein the measuring unit is remotely controlled by the remote control unit;
    wherein the master processor implements control and distribution of individual measuring tasks between the master processor and the slave processor;
    wherein a plurality of test procedures are controlled in parallel;

wherein at least one spatially separate auxiliary processor is connected to the measuring unit, and is controlled by the master processor; and wherein the at least one auxiliary processor provides additional computing capacity for the control of the measurement procedure and evaluation of measured signals.

10. The method according to claim 9, wherein modulated high-frequency signals from the device under test are received in a signal unit positioned in the measuring unit, and modulation parameters are determined from the high frequency signals, which are routed to the master processor.

11. The method according to claim 9, wherein identical or different parts of an evaluation program are outsourced from the master processor to the auxiliary processor or the slave processor.

12. The method according to claim 9, wherein the control of the measuring procedure is implemented by the master processor.

13. The method according to claim 9, further comprising controlling measurement procedure and evaluation of measured signals with a master processor positioned in the measuring unit, or with a slave processor positioned in a control unit that is spatially separate from the measuring unit, wherein at least one spatially separate auxiliary processor is connected to the control unit, and controlled by the master processor.

14. The method according to claim 13, wherein modulated high-frequency signals from the device under test are received in a signal unit positioned in the measuring unit, and modulation parameters are determined from the high frequency signals, which are routed to the master processor.

15. The method according to claim 13, wherein identical or different parts of an evaluation program are outsourced from the master processor to the auxiliary processor or the slave processor.

16. The method according to claim 13, wherein the control of the measuring procedure is always implemented by the master processor.

17. The method according to claim 9, wherein the measuring unit and the control unit are connected by a remote control interface, the remote control interface comprising Ethernet, universal serial bus (USB), a Firewire, general purpose interface bus (GBIP) specification or any combination thereof.

* * * * *